(12) United States Patent
Berke (10) Patent No.: US 9,043,170 B2
(45) Date of Patent: May 26, 2015

(54) SYSTEMS AND METHODS FOR PROVIDING COMPONENT CHARACTERISTICS

(75) Inventor: Stuart Allen Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 633 days.

(21) Appl. No.: 13/403,303

(22) Filed: Feb. 23, 2012

(65) Prior Publication Data

US 2013/0226481 A1   Aug. 29, 2013

(51) Int. Cl.
*G06F 1/16* (2006.01)
*G01R 35/00* (2006.01)
*G06F 15/177* (2006.01)

(52) U.S. Cl.
CPC .................................. *G06F 15/177* (2013.01)

(58) Field of Classification Search
CPC ............ G06F 1/16; G06F 1/26; G06F 15/76; G06F 19/00; G01R 35/00
USPC ............ 702/60, 57, 64–65, 81, 84, 107–108, 702/117–118, 120–121, 127, 182, 189; 324/537, 602, 609–611, 691, 719; 361/679.01–679.02, 679.4; 700/286, 700/297

See application file for complete search history.

(56) References Cited

U.S. PATENT DOCUMENTS

| | | | |
|---|---|---|---|
| 2006/0190532 A1 | 8/2006 | Chadalavada | 709/203 |
| 2006/0212143 A1 | 9/2006 | Nguyen et al. | 700/65 |
| 2009/0001956 A1* | 1/2009 | Velez et al. | 323/304 |
| 2010/0163613 A1 | 7/2010 | Bucher et al. | 235/375 |
| 2010/0293367 A1 | 11/2010 | Berke et al. | 713/100 |
| 2011/0179291 A1 | 7/2011 | Weng et al. | 713/300 |

* cited by examiner

*Primary Examiner* — Toan Le
(74) *Attorney, Agent, or Firm* — Egan, Peterman & Enders LLP.

(57) ABSTRACT

Systems and methods are disclosed for providing a signal indicative of one or more types of individual measurable device characteristic/s that are unique to a given electronic device by providing a signal indicative of the measurable and unique device characteristic/s in a passive manner from the electronic device. The signal indicative of one or more types of individual measurable device characteristic/s may be so provided without requiring operational power to be applied to any active electronic circuitry of the device, and without requiring any power to be generated by the device.

28 Claims, 6 Drawing Sheets

SYSTEMS AND METHODS FOR PROVIDING COMPONENT CHARACTERISTICS

FIELD OF THE INVENTION

This application relates to information handling systems, and more particularly to characteristics of information handling system components.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system is commonly provided with an operating system that is stored on a storage device of the information handling system and executed by a central processing unit (CPU) of the information handling system. Devices such as CPUs are typically productized with multiple thermal design power (TDP) options that can vary over a relatively large range within a standard socket platform. For example, current (2012) Intel® X86 Xeon® E5-2400/2600 processors are offered with TDP stock keeping unit (SKU) code options of 60 W (60 Watts), 70 W, 80 W, 95 W, 115 W, 130 W, 135 W, and 150 W. TDP is the maximum indefinitely sustainable power that the CPU may draw, thus the IHS power delivery and cooling must be sized accordingly. Since TDP is worst case sustainable power consumption for a given TDP SKU, which is guaranteed by manufacturing test and screening ("binning"), the majority of individual CPUs within a TDP SKU will consume considerably lower power than TDP (over many components the CPU power will exhibit a statistical distribution under the TDP limit). In general, the higher the TDP the higher the maximum performance of the CPU. It is expected that these TDP characteristic ranges for a given standard socket platform will widen further in the future.

A typical information handling system platform may only be able to support CPUs having up to a given maximum TDP value. The maximum allowable CPU TDP for a given information handling system platform may be further limited based on the actual populated system configuration present in the information handling system (e.g., drivers, DIMMs, IO adapters, etc.), and/or by anticipated environmental conditions under which the information handling system is to be operated (e.g., air conditioned/controlled data center, office, closet, "fresh-air" cooling deployment, etc.).

Blade and multi-node rack or tower platforms include multiple CPUs, and are typically power and cooling constrained. Thus, there is a need to determine the CPU type and its related TDP within a blade or multi-node platform system to ensure sufficient system power is available to power the CPU package. In some cases, power must be reallocated from other running CPU packages by "throttling down" power to these CPU packages to ensure sufficient power exists for first time power up of a new blade or node, upon which it may report its manufacturer-designated TDP value that corresponds to its SKU value. Today, monolithic, blade, or multi-node platforms typically support multiple power supply units (PSUs), e.g., ~495 watts, 750 watts 1100 watts may be selected for a typical server platform, and the total CPU TDP for a given server platform should be checked before deciding if the PSU type for a given platform is valid for power on. Even after power is applied to a specific CPU package, the reported TDP from the specific CPU package is the general manufacturer-designated TDP value that corresponds to the TDP value designated for the given SKU assigned to the specific CPU package, and is not the actual characteristic or measured TDP value for that specific CPU package instance. As an example, it is possible that an individual CPU package may report itself as having a manufacturer-designated TDP of 95 watt (per the assigned CPU SKU for the device), when the specific individual device actually draws only 72 watts TDP in the worst case.

The common method used by an information handling system to determine the TDP of an installed CPU is for the information handling system to perform a POST sequence, and once the Built-In Operating System (BIOS) is executing, it may read CPU internal control and status registers (CSRs) that have been hardcoded by the manufacturer with the TDP value of the CPU SKU. This method requires a full power-on of the system before the CPU TDP can be determined, and as such, is not suitable for those systems which are power constrained. Several alternative methods have been used or proposed to allow an information handling system to determine the CPU TDP before initiating a full system power-on, but all of these approaches have limitations or drawbacks as will be described.

It is known to store the above-described SKU-based TDP values and other SKU information in a Processor Information ROM (PIROM), powered and accessible with only the auxiliary power rail (Vaux) supplied, within the package of high end CPUs. This implementation is relatively costly and complex, and is therefore implemented only with relatively high end CPUs, and not suitable for processors for the mainstream server (and client) markets.

Dedicated pins have also been added to CPUs to provide a CPU TDP "bin" that indicates processor type of a given device with a 2-bit code. These pins typically can only denote up to 4 values or ranges using the 2-bit code, such as different sub-sets of processors that have different assigned TDP values: 130 watt processor, 80 watt processor, 120 watt processor, and do not distinguish SKU. Although more pins could be used to increase the number of possible bins (for instance 5 pins for 32 bins), CPU manufacturers are reluctant to dedicate scarce (and "costly") pin resources to do so.

It has been proposed to employ a "minimal" CPU power-on state to allow a system to read an assigned CPU TDP SKU value from a CPU over a serial interface such as Intel Corporation's platform environmental control interface (PECI) of the CPU, or other similar interfaces such as System Management Bus (SMBus). However, this solution would be relatively costly, requiring additional components and greater power than the Vaux power level that is typically available. It requires the information handling system to perform a subsequent full power-on reset after the "minimal" power-on, delaying the time for POST.

It has also been proposed to hold a processor in its minimum power state during power-on self-test (POST) by asserting a thermal control circuit code (e.g., PROCHOT) or other mechanism to limit CPU power consumption while the assigned CPU TDP SKU value is read from the CPU. After reading the TDP value, POST may be continued if the read TDP value is determined to be within an acceptable TDP range for the PSU of a blade or multi-node system, or an ALERT and power-off operation may be alternately initiated if the read TDP value is determined to exceed the maximum acceptable TDP for the PSU of the system. This proposed solution delays the time for POST, does not provide actual measured TDP of the individual CPU package, and causes a potential lengthy delay for the factory/field/customer when an ALERT is generated that indicates that the CPU cannot be supported by the system PSU.

It is known to store in-system characterized device characteristics in a non-volatile memory location on a device that is separate from the CPU package, that is to be used during a subsequent system power-on. Such characteristics include CPU serial number, model/SKU number, and other "capabilities" fields to allow identification when a CPU is swapped, or for ensuring that only matching CPUs are populated within a multi-CPU system. However, this stored information is not reliable when components are swapped in the field, and the in-system characterization step for measuring and storing the information is difficult to set up and measure accurately on complex devices such as a multi-core CPUs with multiple power rails.

It has been proposed to use multiplexing "pin straps" with general purpose input/output (GPIO) interface or other IO cell pins/balls to enable assigned CPU TDP SKU value to be provided by DDR pins only under pre-power conditions, after which they return to DDR use. However, multiplexing is problematic from the standpoint of IO cell design, ESD protection circuitry, and reverse biasing.

It is known to use a resistor value provided within an AC adapter to represent a general AC adapter model number (i.e., family of AC adapters). This resistor value is read by a connected laptop computer to verify to the computer that the AC adapter is the appropriate model of adapter device for powering the laptop computer. Specific voltage levels have also been used to convey similar AC adapter information.

CPU packages have been configured to operate in a "turbo mode" that allows dynamic power (Pdyn) to exceed the CPU TDP value by up to a programmable percentage above TDP power, for up to a programmable duration (example: up to 20% above TDP for up to 10 seconds). The Pdyn value is determined during Turbo mode excursion tests, and represent the value needed for guaranteeing that AC/DC DC/DC converters and power supply units (PSUs) do not exceed their rated power.

It is known to vary the resistance or other electrical value of a given circuit under test by laser trimming resistors within the given circuit during testing to achieve a particular value.

SUMMARY OF THE INVENTION

Disclosed herein are systems and methods for providing a signal indicative of one or more types of measurable device characteristic/s (e.g., any characteristic that has a wide value scale including power characteristics such as thermal design power (TDP) characteristics, dynamic power (Pdyn) characteristics, etc.) that are unique to a given electronic device (e.g., such as a central processing unit or other processing device of an information handling system). The disclosed systems and methods may be implemented to first individually measure one or more unique device characteristics and then to provide a signal indicative of such types of measurable and unique device characteristic/s in a passive manner from the electronic device. In one exemplary embodiment, such a signal indicative of measurable and unique device characteristic/s may be so provided without requiring operational power to be applied to active circuitry of the device, and without requiring any power to be generated by the device.

In the practice of the disclosed systems and methods, measurable device characteristic/s may be represented by selected passive electrical characteristics (e.g., capacitance value, resistance value, inductance value, etc.) of one or more passive circuit components that are integrated within the electronic device in a circuit path that is separate from any circuit path of active circuitry (e.g., processing circuitry including active components such as transistors) of the electronic device such that the selected passive electrical characteristics may be discerned (e.g., directly or indirectly measured, sensed, determined, or calculated) by circuitry external to the electronic device without providing any power to the separate active circuitry of the electronic device. The device characteristic/s may be the individually measured actual (characterized) device characteristic/s for a given electronic device. For example, a device characteristic may be individually measured TDP characteristic/s of a given electronic device that may be determined in a passive manner from the device by applying voltage to one or more passive electronic components (e.g., resistors, capacitors, inductors, etc.) integrated within the device, without applying any voltage to the active components (e.g., transistors or other processing components) of the device, and while these active components are in a non-powered state.

In one exemplary embodiment, device characteristics of a given individual electronic device having active electronic components (e.g., such as a CPU) may be measured or characterized (e.g., by the manufacturer, distributor, supplier, etc.) of the device, prior to installation of the electronic device and initial power-up in a system, such as a multi-electronic device system (e.g., a blade or multi-node rack or tower server platform). In this embodiment, testing to measure the actual device characteristics of an individual device may be performed at any time to prior to delivery and/or installation of the electronic device into a system, e.g., testing may be performed at the device manufacturer's factory or facility prior to shipment therefrom. Test methods for measuring device characteristics of an electronic device, such as a CPU, may be performed using any suitable methodology, e.g., TDP characteristics may be measured on a device tester, automatic test equipment (ATE), or other suitable factory station where a worst case thermal stress profile can be invoked, and TDP Power/Thermal Design Current (TDC) current can be measured accurately by the test system.

In one embodiment, the tested electronic device may include one or more integrated passive electronic devices having passive electrical characteristics (e.g., resistance, capacitance, inductance, etc.) that are trimmable or otherwise tunable to a value that is representative of the specific measured device characteristics (e.g., TDP bin) of the individual electronic device. The previously tuned or trimmed passive electrical characteristics may then be later discerned without powering the active electrical components of the device, e.g., using Vaux applied to the electronic device by a power path that is separate from the power path of the active (e.g., processing) circuitry of the electronic device. Once so determined, the measured tuned passive electrical characteristics of the active circuitry may be used to in turn determine the originally measured device (e.g., TDP, Pdyn, etc.) characteristics of the individual electronic device, e.g., via a look-up table or other pre-specified relationship between passive electrical characteristic values and device characteristics of the active circuitry of the electronic device.

Advantageously, in one embodiment the unmodified and conventional low voltage Vaux power supply of an information handling system rack system may be applied to the electronic device to discern the passive electrical characteristics in the manner described above, without requiring activation or enablement of the main PSU or power rail (e.g., +12 volt) of the system. Once the device characteristics are determined, the originally measured device (e.g., TDP, Pdyn, etc.) characteristics of the individual electronic device, e.g., via a look-up table or other pre-specified relationship between passive electrical characteristic values and device characteristics of the active circuitry of the electronic device. In such a case, the main PSU or power rail may only be activated after checking the determined device characteristics to ensure that the main PSU or power is capable of supplying sufficient to power the active circuitry of the electronic device/s.

In another exemplary embodiment, individually measured actual device characteristic of a given electronic device of a multi-electronic device system (e.g., a given CPU package of a blade or multi-node rack or tower platform) may be determined by circuitry external to the electronic device (e.g., such as processing device of the multi-electronic device system) without providing any power to any active circuitry components of the electronic device. For example, the actual TDP or other power characteristic of each given CPU package of a blade or multi-node rack or tower system having multiple CPU packages may be so determined before any power is provided to any active components of the given CPU package to ensure that sufficient system power (e.g., from a system PSU) is available to power the given CPU package together with the other CPU packages and electronic components (e.g., cooling fans, media drives, etc.) of the system. In this regard, the determined device characteristic of one or more CPU packages of a blade or multi-node rack or tower system having multiple CPU packages may be determined and reported by measurement circuitry of the blade or multi-node rack or tower system to a user so that the user can check that sufficient system power is available.

In one respect, disclosed herein is an information handling system, having at least one electronic device that includes: at least one first electronic component coupled to a first circuit path of the electronic device and having a measurable device characteristic that is unique to the electronic component, the device characteristic being an electronic characteristic of circuitry of the first electronic component that is measurable by circuitry external to the electronic device using the first circuit path of the electronic device, and at least one passive circuit component that is separate and different from the first electronic component, the passive circuit component coupled to a second circuit path of the electronic device that is separate and different from the first circuit path, the passive circuit component having a passive electrical characteristic that is discernible by circuitry external to the electronic device using a second circuit path of the electronic device. The passive electrical characteristic may be selected to be indicative of the measurable device characteristic of the first electronic component. The information handling system may also include measurement circuitry external to the at least one electronic device and coupled to the second circuit path of the electronic device and configured to discern the passive electrical characteristic.

In another respect, disclosed herein is an electronic device, including: at least one first electronic component coupled to a first circuit path of the electronic device and having a measurable device characteristic that is unique to the electronic component, the device characteristic being an electronic characteristic of circuitry of the first electronic component that is measurable by circuitry external to the electronic device using the first circuit path of the electronic device; and at least one passive circuit component that is separate and different from the first electronic component, the passive circuit component coupled to a second circuit path of the electronic device that is separate and different from the first circuit path, the passive circuit component having a passive electrical characteristic that is discernible by circuitry external to the electronic device using a second circuit path of the electronic device. The passive electrical characteristic may be selected to be indicative of the measurable device characteristic of the first electronic component.

In another respect, disclosed herein is a method of operating an information handling system. The method may include providing at least one electronic device of the information handling system, and the electronic device may include: at least one first electronic component coupled to a first circuit path of the electronic device and having a measurable device characteristic that is unique to the electronic component, the device characteristic being an electronic characteristic of circuitry of the first electronic component that is measurable by circuitry external to the electronic device using the first circuit path of the electronic device, and at least one passive circuit component that is separate and different from the first electronic component, the passive circuit component coupled to a second circuit path of the electronic device that is separate and different from the first circuit path, the passive circuit component having a passive electrical characteristic that is discernible by circuitry external to the electronic device using a second circuit path of the electronic device with the passive electrical characteristic being selected to be indicative of the measurable device characteristic of the first electronic component. The method may further include discerning the passive electrical characteristic across the second circuit path of the electronic device.

In another respect, disclosed herein is a method of characterizing device characteristics for an electronic device. The method may include: providing at least one electronic device that itself includes at least one first electronic component coupled to a first circuit path of the electronic device, and at least one passive circuit component that is separate and different from the first electronic component, the passive circuit component coupled to a second circuit path of the electronic device that is separate and different from the first circuit path; measuring a device characteristic of the electronic component that is unique to the electronic component across the first circuit path of the electronic device; and tuning a passive electrical characteristic of the passive circuit component to be indicative of the measured device characteristic of the first electronic component. The tuned passive electrical characteristic of the passive circuit component may be discernible by external circuitry using the second circuit path of the electronic device.

DESCRIPTION OF ILLUSTRATIVE EMBODIMENTS

Figure 1:
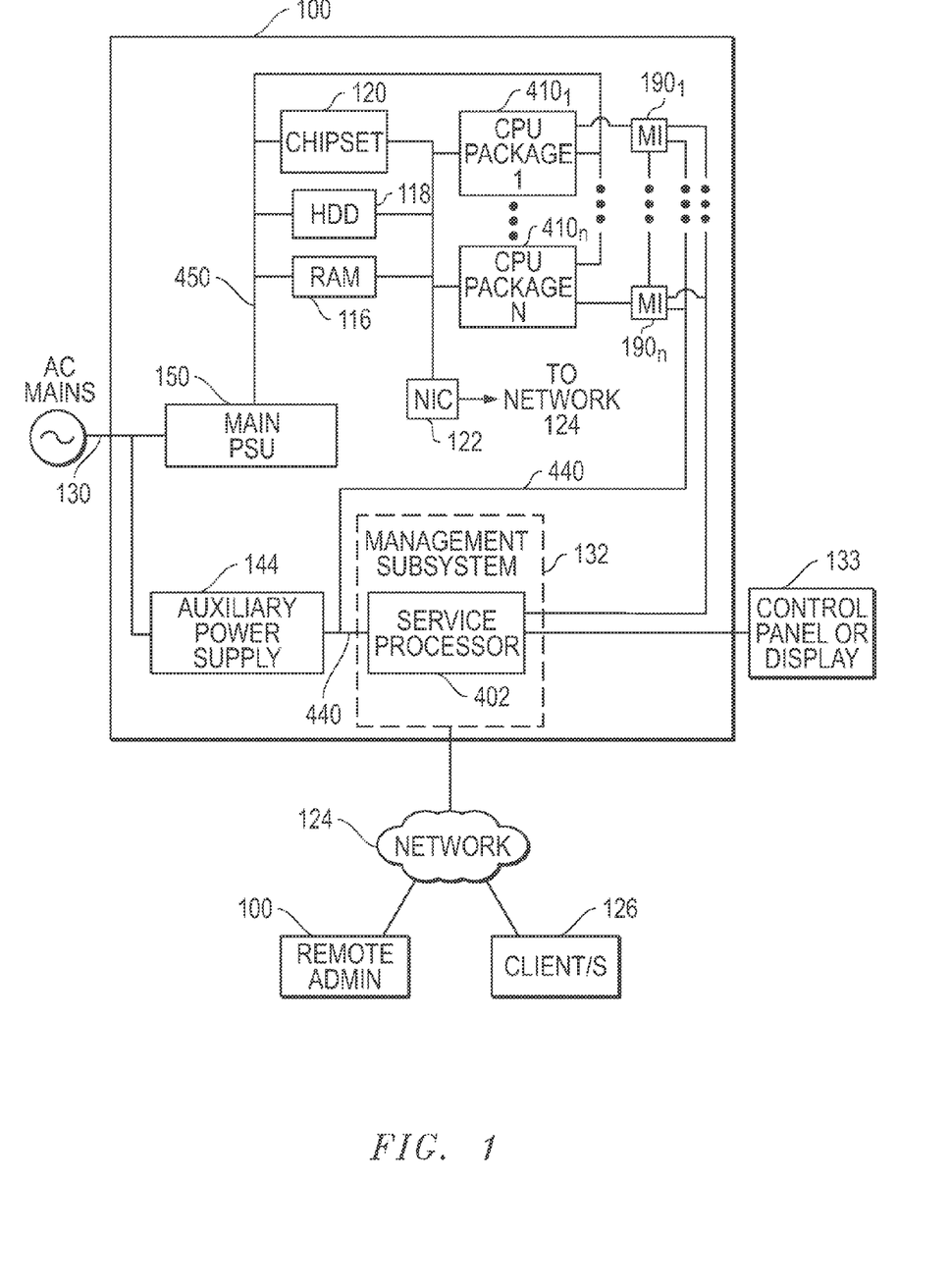
FIG. 1 is a simplified block diagram of an information handling system as it may be configured according to one exemplary embodiment of the disclosed systems and methods.

FIG. 1 is a block diagram illustrating one exemplary embodiment of an information handling system configured in the form of a server 100 having a plurality of information processing components including multiple CPU packages $410_1$ to $410_n$, random access memory (RAM) 116, a hard disk drive (HDD) 118, and a chipset 120 and one or more network interface cards (NIC) 122 that communicatively connect with network 124. In one embodiment, CPU packages $410_1$ to $410_n$ and other components of server 100 may be configured to perform one or more information processing and/or network routing tasks, e.g., for client information handling systems communicatively coupled to server 100 by network 124, e.g., to communicate with client information handling systems 126, such as in a local area network (LAN) configuration or other networking environment. It will be understood that FIG. 1 is merely exemplary, and that the disclosed systems and methods may be implemented with a variety of other types of individual components and/or a variety of other types of information handling systems besides servers, e.g., desktop computers, notebook computers, etc.

As illustrated, in this embodiment a main power supply unit (PSU) 150 receives AC power 130, performs AC/DC power conversion, and provides DC power to the processing components by main power supply rail 450. As further shown, a management subsystem 132 may be present that includes an embedded service management processor 402 (e.g., such as a BMC microcontroller or any other suitable type of processing device) together with other possible components such as RAM, non-volatile storage (NVS) and a NIC to interface with network 124. An auxiliary power source 144 may be provided to run independently of the main PSU 150 and to convert AC power 130 and provide auxiliary DC power (Vaux) 440 to management subsystem 132 and service processor 402, e.g., to allow management subsystem 132 and service processor 402 to reset, power down and power up information handling system 100 as needed. Vaux 440 is also provided to measurement interface circuitry $190_1$ to $190_n$ as shown. As described further herein, Vaux 440 may be coupled to each given one of CPU packages 410 via corresponding measurement interface circuitry 190, and service management subsystem 132 may control or otherwise interface with each measurement interface circuitry component 190 to use Vaux 440 to discern the passive electrical characteristic/s of passive circuit components provided within each of CPU packages 410, e.g., by directly measuring these passive electrical characteristics or indirectly by measuring a value that is based at least partially on these passive electrical characteristics prior to main system power on, and before main system power is supplied to active circuitry of CPU packages 410a and 410b via main power rail 450.

As further illustrated in FIG. 1, management subsystem 132 may be coupled via network 124 to remote administrator/s 100 (e.g., other information handling systems) and/or to an optional local control panel and/or display 133 for displaying information to a local user/administrator. In one embodiment, management subsystem 132 may provide local and/or remote control, reproduction and display of server operating parameters (e.g., including measured passive electrical characteristic/s of passive circuit components provided within each of CPU packages 410 and/or device characteristics of each of CPU packages 410 that are determined based on such measured passive electrical characteristic/s). This may be accomplished, for example, using out of band methods such as Web graphical user interface (GUI) using an integrated Dell Remote Access Controller (iDRAC) available from Dell Products L.P. of Round Rock, Tex. and/or textually via Intelligent Platform Management Interface (IPMI), Dell Remote Access Controller (RACADM) or WS Management (WS-MAN). Further information on remote access controllers may be found in United States Patent Application Publication Number 2006/0212143 and United States Patent Application Publication Number 2006/0190532, each of which is incorporated herein by reference in its entirety. However, it will be understood that other configuration of remote access controllers may be suitably employed in other embodiments.

Figure 2:
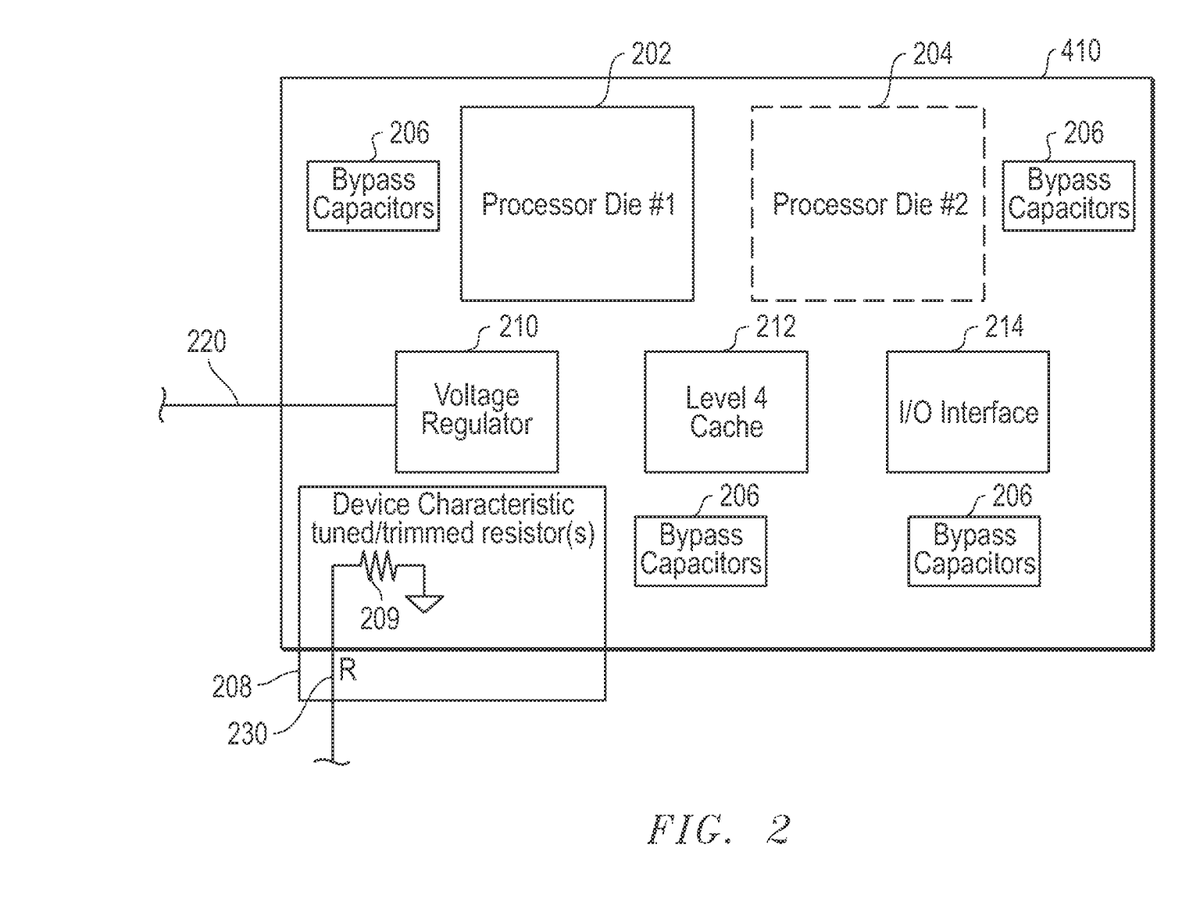
FIG. 2 illustrates a CPU package according to one exemplary embodiment of the disclosed systems and methods.

FIG. 2 illustrates a CPU package 410 including at least one active electronic component in the form of CPU processor die 202 and which may optionally include one or more additional active electronic components such as CPU processor die/s 204 as shown. Example CPU package types include CPU packages available from manufactures such as Intel, AMD, etc. Exemplary CPU package types include, but are not limited to, pin grid array (PGA) packages, ball grid array (BGA) packages, small outline (SOP) packages, etc. Such a semiconductor package may encapsulate or otherwise be configured to seal active electronic component/s within materials such as ceramic, plastic, glass, etc. with electrical contact features (e.g., pins, leads, etc.) exposed outside the package for making electrical connection to circuitry that is external to the package.

As shown in FIG. 2, circuitry of CPU package 410 may also include bypass capacitors 206 and active circuitry such as voltage regulation circuitry 210, I/O interface 214, and cache memory component/s 212 as shown. In the illustrated embodiment, voltage regulator 210 is provided to receive power via power circuit path 220 from main PSU 150, and to regulate this power to meet operating voltage requirements for the active circuitry of CPU package 410 which includes active CPU die/s 202 and 204. It will be understood that the illustrated components of CPU package 410 are exemplary only, and that any other CPU configuration, or other type of electronic device active circuitry configuration may be implemented with the disclosed systems and methods, e.g., using additional and/or alternative active electronic components.

Examples of other possible electronic device active circuitry device types that may be suitably employed in the practice of the disclosed systems and methods include, but are not limited to, processing devices (e.g., such as controllers, microcontrollers, processors, microprocessors, field programmable gate arrays (FPGAs), application specific integrated circuits (ASICs), etc.), memory modules, I/O modules, media drives, circuit assemblies, and other circuits or components including active circuitry such as transistors, amplifiers, transformers, motors, etc.

As further illustrated in FIG. 2, at least one passive circuit component device 208 (e.g., in this case including one or more resistors 209) which may be integrated into the CPU package 410, e.g., on or embedded within the package substrate. In this regard, resistor/s 209 may be a single resistor or multiple resistors that are provided in parallel to present a selected resistance value to TDP value single pin circuit path 230 that is separate and unconnected to power circuit path 220. Example types of resistor components that may be employed for resistor/s 209 include thick film, thin film, ceramic SMD, chip, or other package types, or resistors that are built into the actual substrate as ohmic squares (ratio of length by width allows setting the actual resistance value). Although FIG. 2 illustrates an embodiment employing passive electrical components that are resistors 209, it will be understood that other types of passive electrical components having tunable passive electrical characteristics may be similarly employed, e.g., capacitors, inductors, etc. Such devices may be tunable, for example, by laser trimming.

As described further herein, resistor/s 209 of FIG. 2 may be populated and/or laser trimmed after (or as) the one or more CPUs 202/204 (and any other active circuits) are tested and characterized for TDP so that the resistance value of substrate resistor/s 209 are selected to represent the TDP characteristic/s so determined for the one or more CPUs 202/204 (and any other active circuits). As an example, a CPU package 410 such as illustrated may have TDP characteristics that vary across a relatively wide range (e.g., from 60 watts to 120 watts), depending on the characteristics of the components of each individual CPU package 410, and such that TDP characteristics of one CPU package 410 may be different from the TDP characteristics of another CPU package 410, even if they are in the same CPU package family. It will be understood that multiple physical resistors may be used as needed or desired to cover an extended range of resistance values. Thus, in one exemplary embodiment, effective resistance (R) of passive circuit component device 208 may be accurately trimmed/tuned from one or more parallel resistor components 209 to achieve a selected resistance value that is a proxy for the TDP characteristics determined for the individual CPU package 410, and/or for one or more selected one of multiple CPUs 202/204.

Figure 3:
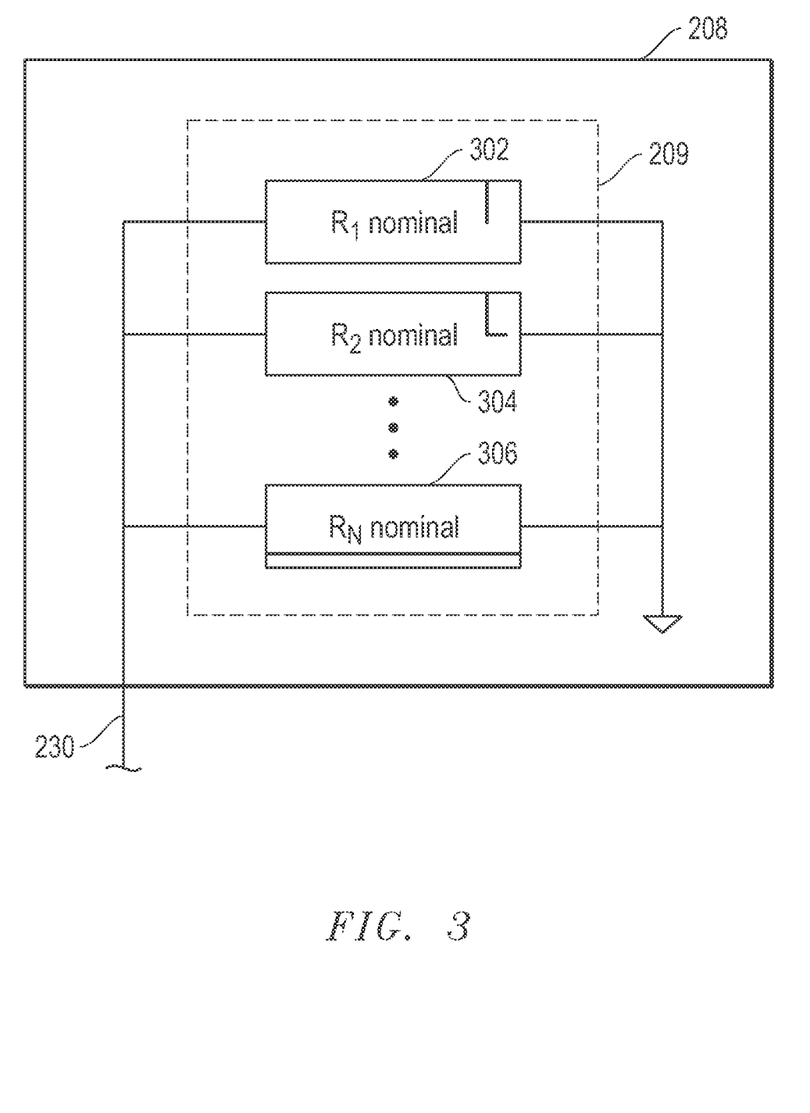
FIG. 3 illustrates a passive circuit component device according to one exemplary embodiment of the disclosed systems and methods.

FIG. 3 illustrates one exemplary embodiment of a passive circuit component device 208 of FIG. 2 that includes N parallel resistor component sites 302, 304 and 306 that together form a tunable resistor element 209 of device 208. In this embodiment, the multiple resistor sites 302, 304 and 306 may be selectively populated or not to achieve an overall coarse parallel resistance value for device 208 that corresponds to the determined TDP characteristics of CPUs 202/204. In this regard, it will be understood that any desired number of multiple parallel resistor component sites may be provided as needed or desired to fit the characteristics of a given application.

Since thick-film and thin-film resistors typically exhibit process fabrication statistical variation from their intended resistance value, the initial (i.e., untrimmed) resistance values for resistors 302, 304 and 306 may be chosen based on the lowest anticipated resistance value variations of the base resistors to ensure that a sufficient range of tunable resistance values for device 208 may be achieved by trimming to achieve a desired proxy resistance value to represent the determined value of TDP for the CPUs 202/204. A laser may then be used to burn away small portions of one or more of multiple resistors 302, 304 and 306 to fine tune the effective resistance value of device 208 by raising their resistance values as necessary. For highest accuracy of resistance value of device 208 as a proxy to the determined (characterized) TDP of an active electronic device/s 202/204, the burning operation may be conducted while the circuit 410 is being tested by automatic test equipment.

It will be understood that resistor trimming may be performed using any technique suitable for varying the resistance of an individual resistor component to achieve a resistance value for the individual resistor component. Exemplary trimming techniques include, but are not limited to, plunge cut, L-cut, Serpentine cut, and scan cut, it being understood that each of these techniques possess unique cost (time) versus accuracy tradeoffs. For example, in FIG. 3 resistor 302 is shown trimmed with a plunge cut (relatively low cost, relatively low accuracy), resistor 304 is shown trimmed with a L-cut (moderate cost, moderate accuracy), and resistor 306 is shown trimmed with a scan or "edge" cut (relatively high cost, relatively high accuracy). In one exemplary embodiment, trimming of substrate resistors 302, 304 and 306 may be performed to achieve an effective resistance value accuracy that is within approximately 0.1% or less of a desired resistance value for a given device 208.

Figure 4:
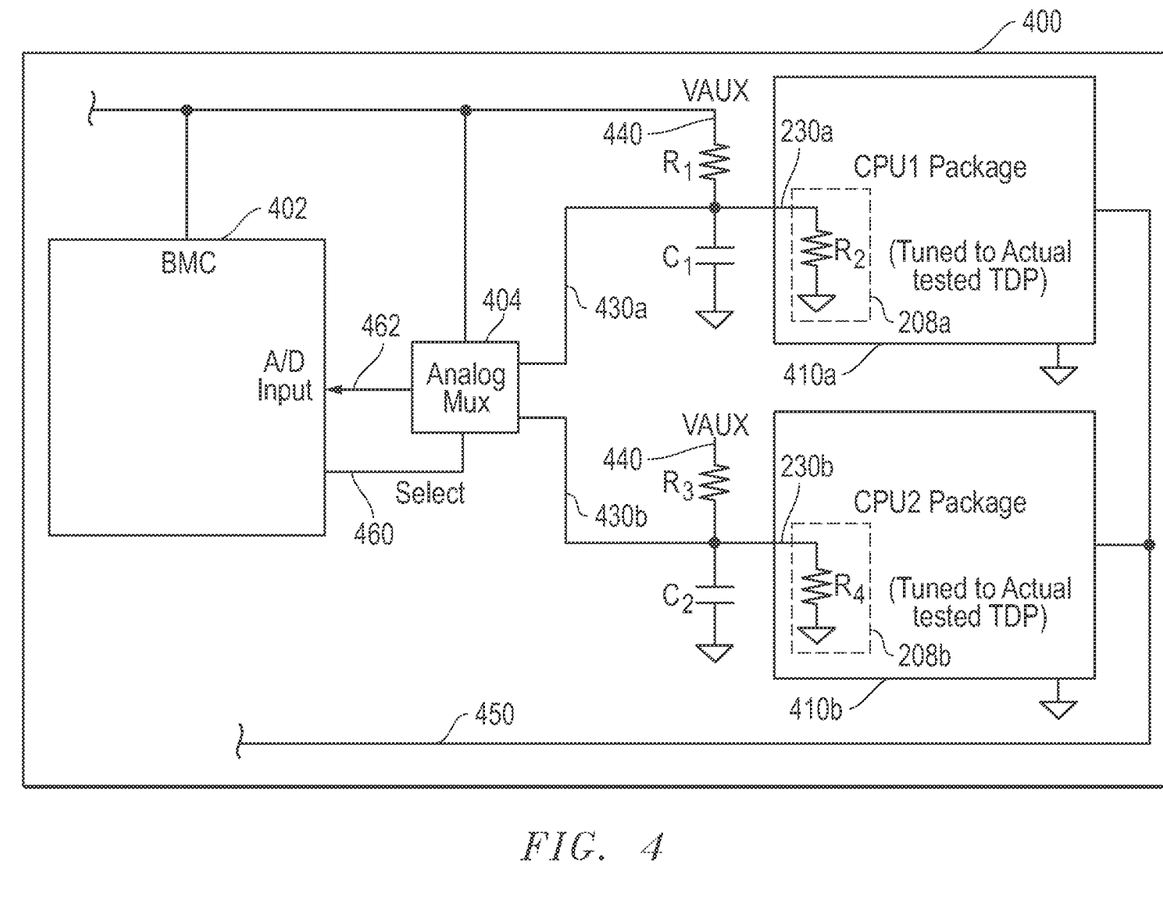
FIG. 4 illustrates a circuit platform according to one exemplary embodiment of the disclosed systems and methods.

FIG. 4 illustrates an exemplary embodiment of a circuit platform 400 that may form a part of an information handling system such as server 100 of FIG. 1. Circuit platform 400 may represent a set of separate components of information handling system 100, or any portion (or all) of components of illustrated platform 400 be provided together on a common circuit board. As shown, platform 400 includes a service management processor 402 in the form of baseboard management controller (BMC) that is coupled to a first CPU package 410a and a second CPU package 410b via analog mux circuitry 404 that may be employed to selectively discern passive electrical characteristics of passive resistor component devices 208a and 208b that are integrated within each of respective separate single CPU packages 410a and 410b of platform 400 as shown via corresponding measurement paths 430a and 430b, which are in turn coupled to CPU package circuit paths 230a and 230b. As illustrated in FIG. 4, each of circuit paths 230a and 230b are coupled to measurement interface circuitry in the form of separate respective system platform (off-package) resistors $R_1$ and $R_3$, e.g., via a respective single CPU package pin provided for each CPU package 410.

Still referring to FIG. 4, each of circuit paths 230a and 230b of respective CPU packages 410a and 410b includes a passive circuit component that in this embodiment includes a respective on-package substrate resistive element $R_2$ or $R_4$ that is coupled on one side to the ground plane and that may be, for example, a tunable resistor element 209 (e.g., set of parallel resistors) of device 208 such as illustrated and described in relation to FIG. 3. In one exemplary embodiment, each CPU package 410a and 410b may include standard ground package pins such that only a single additional package pin is required over the standard CPU package pins in order to implement this exemplary embodiment. Each of off-package resistors $R_1$ and $R_3$ is coupled as shown to a system auxiliary power voltage source (Vaux) 440, that may be a reduced and relatively lower voltage and power (e.g., about 3 volts and less than or equal to about 1 watt) separate from the relatively normal higher system operating voltage and power (e.g., about 12 volts and greater than or equal to about 500-1000 watts) of the main power rail 450 of the information handling system and of platform 400. Off package capacitor elements $C_1$ and $C_2$ may be coupled as shown between ground and each of off-package resistors $R_1$ and $R_3$ as shown for purposes of stabilizing or regulating the circuit. Active circuitry of each of CPU packages 410a and 410b is also coupled to a main PSU 150 via main power supply rail 450 from which active circuitry (e.g., processors, etc.) of CPU packages 410a and 410b receive normal operating power. In some embodiments, one or more DC-DC voltage regulator/s (not shown) may be present between a main PSU and the CPU power input/s to reduce the voltage between the main power supply rail 450 and the CPU power input/s, for example, to reduce a +12 v voltage provided by the main PSU to a reduced voltage of 1.0 v or other voltage required by the CPU/s input. It will be understood that when present, such DC-DC voltage regulator/s are powered off when the main PSU is powered off. As further shown, each of BMC 402 and analog mux circuitry 404 are powered by Vaux 440 and therefore may operate when main power supply rail 450 is not powered on.

In the exemplary embodiment of FIG. 4, a first resistor divider network is formed when off-package resistor $R_1$ is coupled to grounded on-package substrate resistor element $R_2$ by single CPU pin circuit path 230a, and a second resistor divider network is formed when off-package resistor $R_3$ is coupled to grounded on-package (substrate) resistor element $R_4$ by single CPU pin circuit path 230b. Using this configuration allows the effective resistance of each of passive resistor component devices 208a and 208b to be made available via a respective single package pin to measurement circuitry (in this case BMC circuitry 402) of platform 400 that is external to CPU packages 410a and 410b. For example, prior to main system power on, and before main system power is supplied to active circuitry of CPU packages 410a and 410b via main power rail 450, BMC circuitry 402 may discern the effective resistance (e.g., by directly measuring the effective resistance or by measuring a value that is based at least partially on the effective resistance) of each of passive resistor component devices 208a and 208b.

Still referring to FIG. 4, the effective resistance or value that is based at least partially on the effective resistance of each of passive resistor component devices 208a and 208b may be measured when each of off-package resistors $R_1$ and $R_3$ is pulled up to Vaux 440, and without the presence of main system power on power rail 450. In particular, internal analog to digital (A/D) circuitry of BMC 402 (including multiple A/D inputs that are provided standard on some controllers) may be employed to measure the analog divided voltage level of the resistor divider network corresponding to each of CPU package 410a and 410b when Vaux power 440 is present. As shown in this embodiment, analog MUX circuitry 404 (e.g., integrated or separate from BMC 402) may be present to cycle (e.g., in round robin fashion or other suitable sequence) through the multiple CPU packages 410a and 410b to determine the TDP of each sequentially (e.g., through 2, 4, 8, etc. multiple CPU packages 410 in various embodiments). In this regard, BMC 402 may use select signal 460 to selectably control measurement of any one of the measurement paths 430 and corresponding resistor divider network that corresponds to one of the multiple CPU packages 410. In this way, a resistor divider voltage level value that is based on the effective resistance of each of separate passive resistor component devices 208a and 208b may be individually measured via analog input 462 so that the TDP characteristics of each of the individual CPU packages 410a and 410b may be determined using only Vaux before powering on main power rail 450 and active circuitry of CPU packages 410a and 410b. It will be understood that electrical characteristics of other types of passive electrical components having tunable passive electrical characteristics (e.g., inductors, capacitors, etc.) may be measured, e.g., by a BMC component 402 or other suitable system board measuring technique, with or without mux circuitry 404.

Table 1 illustrates an example set of measured package TDP characteristic values (e.g., 20 watts to 210 watts) as they may be assigned to combinations of different tuned resistance values (400-4200 ohms) of an on-package resistive element (e.g., $R_2$ or $R_4$ of FIG. 4) with a 1000 ohm resistance value of an off-package resistor (e.g., $R_1$ or $R_3$ of FIG. 4) that together form a resistor divider network as illustrated in FIG. 4. Such a 20 watt to 210 watt range of TDP characteristic values is exemplary only, but exceeds the range necessary for current server CPUs. As shown in Table 1, each different on-package resistance value results in a different resistor divider voltage value (i.e., a value that is based at least partially on the on-package resistance value) which may be measured during pre-power state in the manner described above for FIG. 4. The embodiment of Table 1 has been constructed assuming a Vaux power supply of 3.3 volts. This results in an analog resistor divider voltage range of from about 0.9 volts to about 2.7 volts for the indicate resistance value combinations. This analog voltage range is suitable for A/D input circuitry of conventional BMC components, however it will be understood that Vaux may have greater or lesser values and/or that resistance values of on-package and off-package resistor elements may differ and be selected to result in other analog resistor divider voltage ranges, e.g., as applicable to fit the characteristics of a given application.

In the exemplary embodiment of Table 1, a range of TDP characteristics from 20 watts to 210 watts has been divided into 5 watt incremental values that are each assigned to the possible measured values of resistor divider voltage that result from an off-package resistor element resistance value of 1000 ohms in combination with the possible tuned on-package substrate resistor element values from 400 ohms to 4200 ohms. Thus, once TDP wattage value of a given individual CPU package (or other type of device) are measured, the on-package substrate resistor may be tuned to the resistance value that corresponds to the value indicated by the table for the given TDP value. For example, in one embodiment, the minimum Table 1 on-package resistance value of 400 ohms may be achieved when all parallel resistors of an on-package resistive element (e.g., $R_2$ or $R_4$ of FIG. 4) are untrimmed. The indicated values of on-package resistance value greater than 400 ohms may be achieved by trimming and/or removing individual parallel resistors as applicable to achieve the desired resistance value to match the resistor divider voltage ($R_{DV}$) corresponding to the measured TDP wattage value of Table 1. Although this illustrative example provides resolution of TDP to within 5 W increments, by trimming the resistors to better than 100 ohm steps it is possible to provide the TDP to arbitrarily better precision (e.g., less than 0.1 W). The equation for determining resistor divider voltage ($R_{DV}$) based on various combinations of on-package resistance value ($R_{ON}$) and off-package resistor resistance value ($R_{OFF}$) may be expressed for an embodiment such as FIG. 4 as follows:

$$R_{DV} = (R_{ON}/(R_{ON}+R_{OFF})) \times Vaux$$

TABLE 1

| Actual Package TDP Value (Watts) | On-Package Substrate Resistor Resistance Value (Ohms) | Off-Package Platform Resistor Resistance (Ohms) | Measured Resistor Divider Voltage (assuming Vaux = 3.3 v) |
|---|---|---|---|
| 20 | 400 | 1000 | 0.9429 |
| 25 | 500 | 1000 | 1.1000 |
| 30 | 600 | 1000 | 1.2375 |
| 35 | 700 | 1000 | 1.3588 |
| 40 | 800 | 1000 | 1.4667 |
| 45 | 900 | 1000 | 1.5632 |
| 50 | 1000 | 1000 | 1.6500 |
| 55 | 1100 | 1000 | 1.7286 |

TABLE 1-continued

| Actual Package TDP Value (Watts) | On-Package Substrate Resistor Resistance Value (Ohms) | Off-Package Platform Resistor Resistance (Ohms) | Measured Resistor Divider Voltage (assuming Vaux = 3.3 v) |
|---|---|---|---|
| 60 | 1200 | 1000 | 1.8000 |
| 65 | 1300 | 1000 | 1.8652 |
| 70 | 1400 | 1000 | 1.9250 |
| 75 | 1500 | 1000 | 1.9800 |
| 80 | 1600 | 1000 | 2.0308 |
| 85 | 1700 | 1000 | 2.0778 |
| 90 | 1800 | 1000 | 2.1214 |
| 95 | 1900 | 1000 | 2.1621 |
| 100 | 2000 | 1000 | 2.2000 |
| 105 | 2100 | 1000 | 2.2355 |
| 110 | 2200 | 1000 | 2.2688 |
| 115 | 2300 | 1000 | 2.3000 |
| 120 | 2400 | 1000 | 2.3294 |
| 125 | 2500 | 1000 | 2.3571 |
| 130 | 2600 | 1000 | 2.3833 |
| 135 | 2700 | 1000 | 2.4081 |
| 140 | 2800 | 1000 | 2.4316 |
| 145 | 2900 | 1000 | 2.4538 |
| 150 | 3000 | 1000 | 2.4750 |
| 155 | 3100 | 1000 | 2.4951 |
| 160 | 3200 | 1000 | 2.5143 |
| 165 | 3300 | 1000 | 2.5326 |
| 170 | 3400 | 1000 | 2.5500 |
| 175 | 3500 | 1000 | 2.5667 |
| 180 | 3600 | 1000 | 2.5826 |
| 185 | 3700 | 1000 | 2.5979 |
| 190 | 3800 | 1000 | 2.6125 |
| 195 | 3900 | 1000 | 2.6265 |
| 200 | 4000 | 1000 | 2.6400 |
| 205 | 4100 | 1000 | 2.6529 |
| 210 | 4200 | 1000 | 2.6654 |

Since analog MUX circuitry 404 may be coupled to additional devices via additional respective measurement paths 430, it will be understood that resistor divider networks or other passive electrical component circuitry of additional CPU packages or other devices may be similarly selected and measured by BMC 402 using analog MUX circuitry 404. Thus, in embodiments employing MUX circuitry such as illustrated in FIG. 4, it is possible to determine the TDP or other power characteristics of additional devices by merely coupling additional measurement paths 430 to the MUX circuitry to the passive circuit components of the additional devices, without requiring modifications to the measurement circuitry (e.g., such as a BMC or other suitable processing device). BMC 402 may also be configured to determine the TDP or other power characteristics of each individual CPU package (e.g., using a relationship such as Table 1) and/or to optionally sum the total TDP or other power characteristics of all CPU packages or other devices coupled to BMC 402. BMC 402 may report this determined power characteristic information to a local or remote user (e.g., remotely or via GUI on control panel/display 133) who may use this information to determine if sufficient main power exists to power the coupled CPU packages, and/or BMC 402 may automatically calculate whether or not sufficient main power exists to power the coupled CPU packages and report this information to a user. Other user decisions may be made, such as rejecting a given CPU package having excessively high power characteristics and substituting with another CPU package having lower power characteristics, or determining that PSU capacity exists for adding one or more additional CPU packages to the system.

It will be understood that the embodiment of FIG. 4 is exemplary only, and that the number of CPU packages 410 may be greater than two, and/or that other types of electronic devices with active component/s (e.g., module, riser, mezzanine, PCIe card, other board assemblies, memory modules such as dual in-line memory modules DIMMs, media drives, graphics processing unit "GPU", other assembly with a range of TDP values or other characteristics, etc.) may be similarly provided with respective resistor divider networks or other types of passive component circuitry having passive electrical characteristics that may be measured under pre-power on conditions to determine electrical characteristics of the active components off each individual device. It will also be understood that the passive electrical characteristics may be made available to system measurement circuitry directly via one or more dedicated assembly connector pins, or indirectly via a system management interface (e.g., such as I2C, SMBus, PMBus, PECI, etc.) and suitable measurement logic on the system assembly running via Vaux or other auxiliary or non-main system power source.

With regard to the embodiment of FIG. 4, it will be further understood that any desired number of CPU packages 410 or other electronic devices may be provided with corresponding grounded passive resistor component devices 208 that are each coupled to analog MUX circuitry 404 and off-package resistor components in a manner similar to that illustrated in FIG. 4. Moreover, other variations are possible, e.g., off package Vaux pull-up resistors $R_1$ and $R_3$ may be alternatively coupled to analog input path 462 between MUX circuitry 404 and BMC 402 to save power and cost. Further, it will be understood in other embodiments a single CPU package 410 or other electronic device may be coupled directly to measurement circuitry (e.g., such as BMC 402) without requiring MUX circuitry, and/or that other passive electrical component circuit configurations and measurement interface circuitry other than off-package resistors configured for forming resistor divider networks may be provided for measurement.

Figure 5:
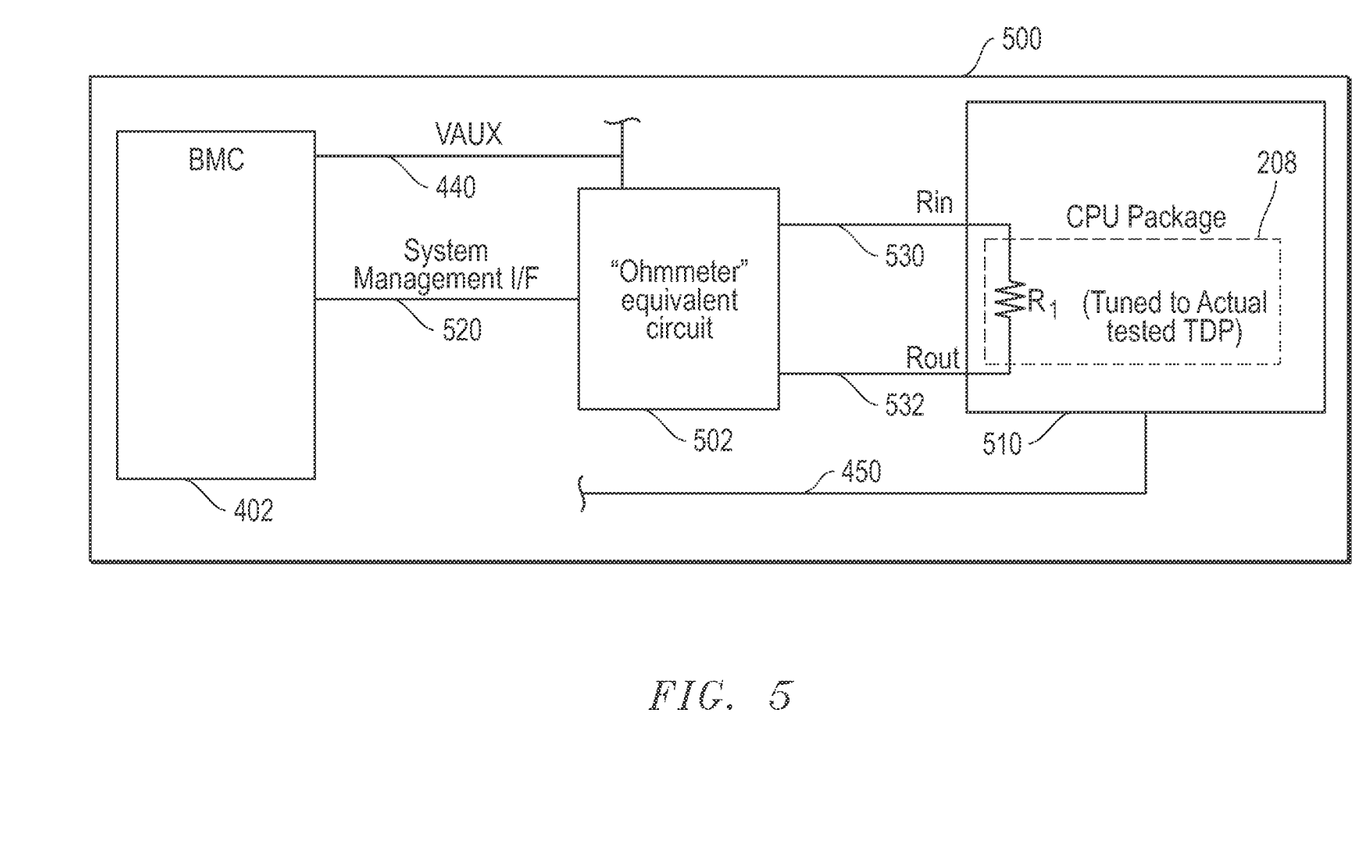
FIG. 5 illustrates a circuit platform according to one exemplary embodiment of the disclosed systems and methods.

FIG. 5 illustrates another exemplary embodiment of a circuit platform 500 that forms a part of an information handling system such as may be configured as a server. As shown, platform 500 includes a baseboard management controller (BMC) 402 that may be coupled via system management interface to a CPU package 410 via measurement interface circuitry in the form of ohmmeter circuitry (two terminal type) 502 or other circuitry suitable for directly measuring resistance of an on-package resistor $R_1$ using measurement paths 530 and 532 coupled to two provided pins ($R_{in}$ and $R_{out}$) of CPU package 410, between which resistor element $R_1$ of passive circuit component device 208 is coupled as shown. In one exemplary embodiment, ohmmeter circuitry 502 may source electrical current (I) through on-package resistor $R_1$ via measurement paths 530 and 532 to measure resulting voltage (V) across resistor $R_1$ and then may determine resistance value of $R_1$=V/I. BMC 402 may then use this determined resistance value determine the device characteristic/s (e.g., TDP, Pdyn, etc.) of CPU package 410 in a manner similar to that described elsewhere herein.

In the embodiment of FIG. 5, resistor element $R_1$ may be include one or more resistors and may be tuned as previously described to have an effective resistance value that represents the device characteristic/s determined for the individual CPU package 410, e.g., by using an appropriate table of effective on-package resistor element resistance values versus measured TDP value in a manner similar to Table 1. Before the active circuitry of CPU package 410 is powered on by main power rail 450, resistance-measuring circuitry 502 may be powered by Vaux and used to measure the resistance of resistor element $R_1$ of passive circuit component device 208. BMC 402, also powered by Vaux while main power rail 450 is not powered, may communicate across system management interface path 520 with resistance-measuring circuitry 502 to retrieve the measured effective resistance value from resistance measuring circuitry 502. A look-up table or other data relationship similar to Table 1 may be created, but using this measured effective resistance information instead of divider voltage information.

Figure 6:
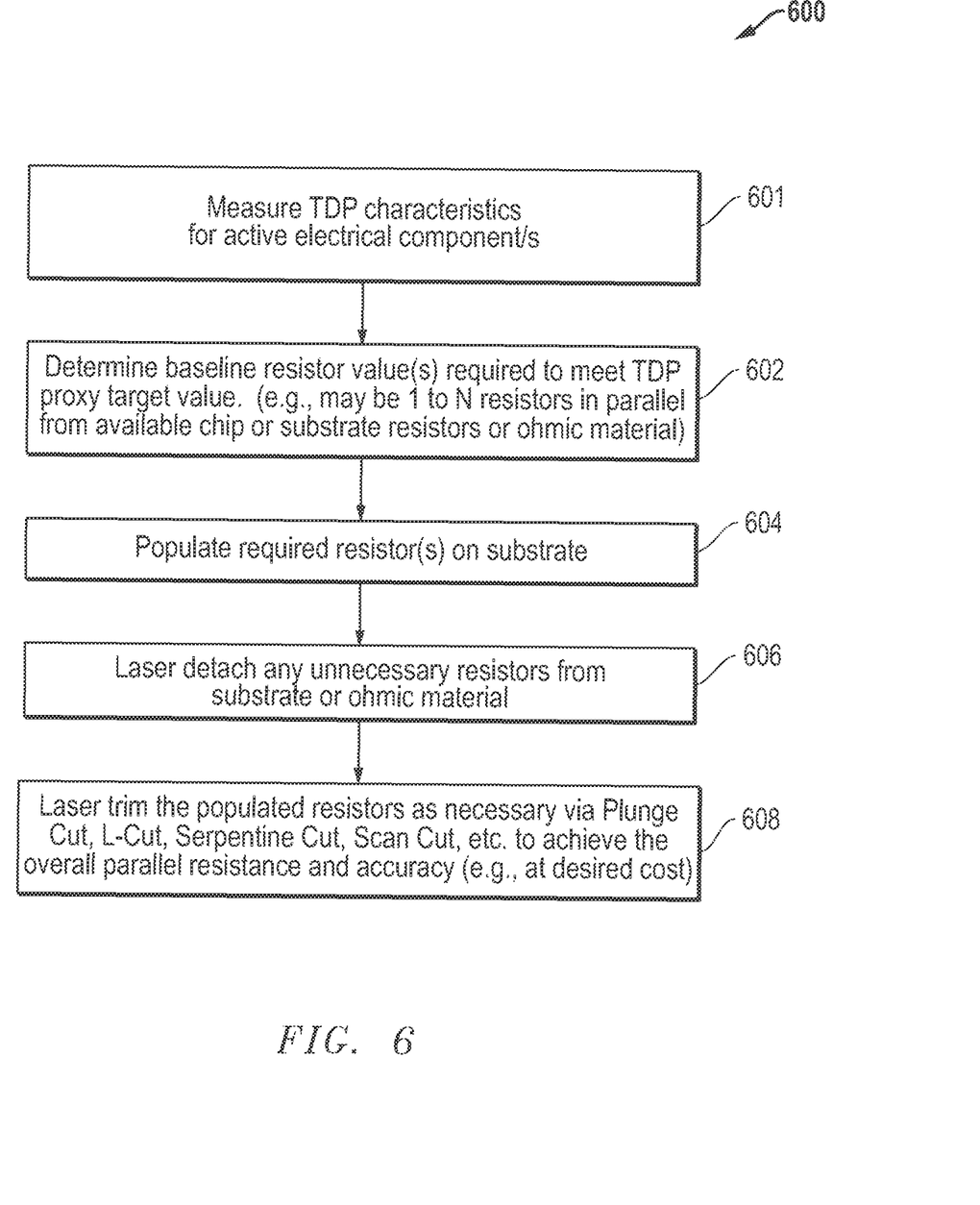
FIG. 6 illustrates methodology according to one exemplary embodiment of the disclosed systems and methods.

FIG. 6 illustrates one exemplary embodiment of methodology 600 that may be implemented, for example, to provide a passive circuit component device 208 (e.g., including parallel substrate resistors 209) with selected passive electrical characteristics that represent TDP characteristics determined for an individual CPU or group of CPUs (e.g., such as one or more of CPUs 202/204) of FIG. 4. As shown, methodology 600 starts in step 601 where TDP characteristics of a one or more active electronic components (e.g., such as CPUs 202/204) may be measured or characterized (e.g., by the manufacturer, distributor, supplier, etc. of the active component/s) prior to installation of the electronic device and initial power-up in a system. Such testing may be performed, for example, at the device manufacturer's factory or facility prior to shipment therefrom, using any test methodology suitable for measuring TDP characteristics of the active electrical component/s under test, e.g., such as on a device tester, automatic test equipment (ATE), or other suitable factory station. As previously described TDP characteristics are just one example power characteristic of active electronic components that may be measured or characterized prior to installation of the electronic device and initial power-up in a system. In another example, Pdyn (instead of the TDP value) may be measured during Turbo mode excursion tests and then a passive electrical component tuned to a proxy target value for Pdyn in the manner described herein for the TDP embodiment.

Next, in step 602, baseline resistor value(s) may be determined that are required to meet a TDP proxy target value (e.g., resistance value, resistor divider voltage, etc.) for the particular measured TDP characteristic value determined in step 601. For example, referring to the exemplary embodiment of FIG. 3, a different range of possible resistance values or resistor divider voltage values may be achieved depending on how many resistors $R_1$ to $R_N$ are coupled in parallel, with lower ranges of resistance values possible as the selected number of parallel resistors increase. For example, given a measured TDP characteristic of 117 watts, a baseline on-package resistance value of 2300 watts would be desirable based on the example of Table 1. Once the number (and identity) of on-package resistors required to achieve the TDP proxy target value are determined in step 602, this number of resistors may be populated (e.g., pick and placed) if necessary on the package substrate or other device as required in step 604. Next, in step 606, any unnecessary existing on-package resistors may be decoupled (e.g., laser detached) from the package measurement pin/s to be employed for TDP proxy value measurement.

Next, in step 608, one or more of the remaining connected resistors may be tuned (e.g., by laser trimming) to achieve the desired resistance, or one or more of the coupled resistors may be tuned (e.g., laser trimmed) to achieve the desired TDP proxy value for the package or device. For the measured TDP of 117 watts, the remaining connected on-package resistors may be trimmed to achieve an on-package resistance value of 2340 watts based on Table 1, with each 1 W of TDP corresponding to 20 W of Ron in Table 1 of this particular illustrative embodiment. It will be understood that the methodology of FIG. 6 is exemplary only, and that additional, fewer, and/or alternative steps may be employed to provide a passive circuit component device with selected passive electrical characteristics that represent TDP characteristics determined for an individual CPU, group of CPUs, or other device.

It will be understood that one or more steps or tasks of the techniques and methodology disclosed herein (e.g., such as described in relation to FIG. 6) may be implemented by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as a processor, microprocessor, microcontroller, controller, etc.) to perform the one or more steps. A computer program of instructions may be stored in or on the non-transitory computer-readable medium residing on or accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodology may be employed in one or more code segments of the present computer program. For example, a code segment executed by the information handling system may include one or more steps of the disclosed methodology.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
at least one electronic device comprising:
at least one first electronic component comprising active circuitry coupled to a first circuit path of the electronic device and having a measurable device characteristic that is unique to the electronic component, the device characteristic being an electronic characteristic of circuitry of the first electronic component that is measurable by circuitry external to the electronic device using the first circuit path of the electronic device, and at least one passive circuit component that is separate and different from the first electronic component, the passive circuit component coupled to a second circuit path of the electronic device that is separate from and unconnected to the first circuit path, the passive circuit component having a passive electrical characteristic that is discernible by circuitry external to the electronic device using a second circuit path of the electronic device, where the passive electrical characteristic is selected to be indicative of the measurable device characteristic of the first electronic component; and measurement circuitry external to the at least one electronic device and coupled to the second circuit path of the electronic device and configured to discern the passive electrical characteristic without providing any power to any active circuitry components of the electronic device.

2. The information handling system of claim 1, where the first circuit path of the first electronic device comprises a power path for supplying power to the active circuitry of the first electronic component; where the second circuit path comprises no active circuitry; and where the information handling system further comprises:

a main power source coupled to supply main power to the active circuitry of the first electronic component via the first circuit path of the first electronic device; and an auxiliary power source separate and different from the main power source, the alternate power source being coupled to supply power to the passive circuit component via the second circuit path of the first electronic device;

where the passive electrical characteristics of the passive circuit component are discernible by the measurement circuitry by supplying auxiliary power to the passive circuit component across the second circuit path of the electronic device and without supplying any main power to the active circuitry of the first electronic component across the first circuit path.

3. The information handling system of claim 2, where the information handing system comprises a server system configured to utilize a variable number of central processing unit (CPU) packages, each of the multiple CPU package devices being a separate one of the electronic devices of the system and having active circuitry that comprises at least one active processing device and has a measurable power characteristic that is different from the measurable power characteristic of the active circuitry of each other of the multiple CPU package devices; where the passive circuit component of each of the multiple CPU packages comprises at least one of a resistor, capacitor, inductor, or a combination thereof; and where the discernible passive electrical characteristic is based at least partially on at least one of resistance, capacitance or inductance of the passive circuit component.

4. The information handling system of claim 3, where the measurement circuitry comprises a baseboard management controller (BMC) of the server system that is coupled to the second circuit path of each of the multiple CPU packages; and where the active processing device of each of the multiple CPU package comprises at least one processing device having a measurable power characteristic that comprises at least one of a thermal design power (TDP) characteristic or a dynamic power (Pdyn) characteristic.

5. The information handling system of claim 4, where the at least one passive circuit component of each of the multiple CPU packages comprises at least one resistor coupled in the second circuit path between a single external pin of the CPU package and ground, and where the system further comprises measurement interface circuitry that comprises at least one off-package resistor coupled between the auxiliary power source and each external pin of each given CPU package to form a resistor divider network with the corresponding on-package resistor of each given CPU package, the BMC being configured to measure the voltage of the resistor divider network when voltage is supplied to the resistor divider network across the second circuit path by the auxiliary power source.

6. The information handling system of claim 1, where the at least one passive circuit component comprises multiple trimmable resistors that are coupled in parallel within the second circuit path; and where at least one of the multiple trimmable resistors is configured to be decoupled from the second circuit path to vary the discernible resistance of the second circuit path without decoupling one or more others of the multiple trimmable resistors from the second circuit path.

7. An electronic device, comprising:

at least one first electronic component comprising active circuitry coupled to a first circuit path of the electronic device and having a measurable device characteristic that is unique to the electronic component, the device characteristic being an electronic characteristic of circuitry of the first electronic component that is measurable by circuitry external to the electronic device using the first circuit path of the electronic device; and at least one passive circuit component that is separate and different from the first electronic component, the passive circuit component coupled to a second circuit path of the electronic device that is separate from and unconnected to the first circuit path, the passive circuit component having a passive electrical characteristic that is discernible by circuitry external to the electronic device using a second circuit path of the electronic device;

where the passive electrical characteristic is selected to be indicative of the measurable device characteristic of the first electronic component without providing any power to any active circuitry components of the electronic device.

8. The electronic device of claim 7, where the first electronic component comprises at least one active electrical component having a measurable power characteristic; where the passive circuit component comprises at least one of a resistor, capacitor, inductor, or a combination thereof; and where the discernible passive electrical characteristic is based at least partially on at least one of resistance, capacitance or inductance of the passive circuit component.

9. The electronic device of claim 7, where the first electronic component comprises at least one processing device having a measurable power characteristic that comprises at least one of a thermal design power (TDP) characteristic or a dynamic power (Pdyn) characteristic.

10. The electronic device of claim 7, where the electronic device comprises a central processing unit (CPU) package; where the first electronic component comprises at least one CPU die having a measurable power characteristic that comprises at least one of a thermal design power (TDP) characteristic or a dynamic power (Pdyn) characteristic.

11. The electronic device of claim 7, where the first circuit path of the electronic device comprises a power path for supplying power to the active circuitry of the first electronic component; where the second circuit path comprises no active circuitry; and where the passive electrical characteristics of the passive circuit component are discernible by circuitry external to the electronic device using a second circuit path of the electronic device and without supplying any power to the active circuitry of the first electronic component across the first circuit path.

12. The electronic device of claim 7, where the at least one passive circuit component comprises multiple trimmable resistors that are coupled in parallel within the second circuit path; and where at least one of the multiple trimmable resistors is configured to be decoupled from the second circuit path to vary the discernible resistance of the second circuit path without decoupling one or more others of the multiple trimmable resistors from the second circuit path.

13. The electronic device of claim 7, where the at least one passive circuit component comprises at least one resistor coupled in the second circuit path between a single external pin of the electronic device and ground, the single external pin configured for coupling the second circuit path to circuitry external to the electronic device to allow the passive electrical characteristic of the at least one passive circuit component to be discerned by the external circuitry coupled to the second circuit path.

14. The electronic device of claim 7, where the first electronic component comprises at least one central processing unit (CPU) die; where the electronic device comprises a CPU package including the at least one active CPU die and the passive circuit component integrated within the CPU package; where the first circuit path of the electronic device comprises a power path coupled from outside the CPU package to the active CPU die to supply power to the active CPU die; and where the second circuit path comprises no active circuitry and is coupled from outside the CPU package to the passive circuit component, the second circuit path being separate from and unconnected to the first circuit path within the CPU package.

15. The electronic device of claim 14, where the second circuit path is a single pin CPU circuit path connected between a single pin of the CPU package and the passive circuit component.

16. The electronic device of claim 7, where the first electronic component comprises at least one central processing unit (CPU) die; where the electronic device comprises a CPU package including the at least one active CPU die and the passive circuit component integrated within the CPU package; where the first circuit path of the electronic device comprises a power path coupled from outside the CPU package to the active CPU die to supply power to the active CPU die; and where the second circuit path comprises no active circuitry and is unconnected to the CPU die within the CPU package.

17. A method of operating an information handling system, comprising:
  providing at least one electronic device of the information handling system, the electronic device comprising:
    at least one first electronic component comprising active circuitry coupled to a first circuit path of the electronic device and having a measurable device characteristic that is unique to the electronic component, the device characteristic being an electronic characteristic of circuitry of the first electronic component that is measurable by circuitry external to the electronic device using the first circuit path of the electronic device, and
    at least one passive circuit component that is separate and different from the first electronic component, the passive circuit component coupled to a second circuit path of the electronic device that is that is separate from and unconnected to the first circuit path, the passive circuit component having a passive electrical characteristic that is discernible by circuitry external to the electronic device using a second circuit path of the electronic device with the passive electrical characteristic being selected to be indicative of the measurable device characteristic of the first electronic component;
  providing measurement circuitry of the information handling system, the measurement circuitry including at least one processing device coupled to the second circuit path of the electronic device; and
  using the processing device of the measurement circuitry to discern the passive electrical characteristic across the second circuit path of the electronic device without providing any power to any active circuitry components of the electronic device.

18. The method of claim 17, where the first circuit path of the first electronic device comprises a power path for supplying main power to the active circuitry of the first electronic component; where the second circuit path comprises no active circuitry; and where the method further comprises:
  supplying auxiliary power to the passive circuit component across the second circuit path of the first electronic device without supplying any main power to the active circuitry of the first electronic component across the first circuit path;
  using the processing device of the measurement circuitry to discern the passive electrical characteristic of the passive circuit using the auxiliary power supplied to the passive circuit component across the second circuit path of the electronic device and without supplying any main power to the active circuitry of the first electronic component across the first circuit path; and
  using the processing device of the measurement circuitry to determine the device characteristic of circuitry of the first electronic component based at least in part on the discerned passive electrical characteristic of the passive circuit before supplying any main power to the active circuitry of the first electronic component across the first circuit path.

19. The method of claim 18, where the information handling system comprises a server system configured to utilize a variable number of multiple central processing unit (CPU) packages, each of the multiple CPU package devices being a separate one of the electronic devices of the system and having active circuitry that comprises at least one active processing device and has a measurable power characteristic that is different from the measurable power characteristic of the active circuitry of each other of the multiple CPU package devices; where the passive circuit component of each of the multiple CPU packages comprises at least one of a resistor, capacitor, inductor, or a combination thereof; and where the method further comprises using the processing device of the measurement circuitry to determine the measurable power characteristic of the first electronic component based at least in part on a discerned passive electrical characteristic of the passive electrical component that is based at least partially on at least one of resistance, capacitance or inductance of the passive circuit component.

20. The method of claim 19, where the at least one processing device of the measurement circuitry comprises a baseboard management controller (BMC) of the server system that is coupled to the second circuit path of each of the multiple CPU packages; and where the active processing device of each of the multiple CPU package comprises at least one processing device having a measurable power characteristic that comprises at least one of a thermal design power (TDP) characteristic or a dynamic power (Pdyn) characteristic.

21. The method of claim 17, where the first electronic component comprises at least one central processing unit (CPU) die; where the electronic device comprises a CPU package including the at least one active CPU die and the passive circuit component integrated within the CPU package; where the first circuit path of the electronic device comprises a power path coupled from outside the CPU package to the active CPU die to supply power to the active CPU die; and where the second circuit path comprises no active circuitry and is coupled from outside the CPU package to the passive circuit component, the second circuit path being separate from and unconnected to the first circuit path within the CPU package.

22. The method of claim 21, where the second circuit path is a single pin CPU circuit path connected between a single pin of the CPU package and the passive circuit component.

23. The method of claim 17, where the first electronic component comprises at least one central processing unit (CPU) die; where the electronic device comprises a CPU package including the at least one active CPU die and the passive circuit component integrated within the CPU package; where the first circuit path of the electronic device comprises a power path coupled from outside the CPU package to the active CPU die to supply power to the active CPU die; and where the second circuit path comprises no active circuitry and is unconnected to the CPU die within the CPU package.

24. A method of characterizing device characteristics for an electronic device comprising active circuitry, the method comprising:
providing at least one electronic device that itself comprises at least one first electronic component coupled to a first circuit path of the electronic device, and at least one passive circuit component that is separate and different from the first electronic component, the passive circuit component coupled to a second circuit path of the electronic device that is separate from and unconnected to the first circuit path;
providing at least one processing device coupled to the electronic device;
using the at least one processing device to measure a device characteristic of the electronic component that is unique to the electronic component across the first circuit path of the electronic device; and
trimming the passive circuit component to tune a passive electrical characteristic of the passive circuit component to be indicative of the measured device characteristic of the first electronic component;
where the tuned passive electrical characteristic of the passive circuit component is discernible by external circuitry using the second circuit path of the electronic device without providing any power to any active circuitry components of the electronic device.

25. The method of claim 24, where the first electronic component comprises at least one active electrical component having a measurable power characteristic; where the passive circuit component comprises at least one of a resistor, capacitor, inductor, or a combination thereof; and where the discernible passive electrical characteristic is based at least partially on at least one of resistance, capacitance or inductance of the passive circuit component.

26. The method of claim 24, where the electronic device comprises a central processing unit (CPU) package; where the first electronic component comprises at least one CPU die having a measurable power characteristic that comprises at least one of a thermal design power (TDP) characteristic or a dynamic power (Pdyn) characteristic.

27. The method of claim 24, where the discernible passive electrical characteristic is based at least partially on resistance; where the at least one passive circuit component comprises multiple resistors that are coupled in parallel within the second circuit path; and where the method further comprises performing one or more of the following steps to tune the passive electrical characteristic of the passive circuit component to be indicative of the measured device characteristic of the first electronic component:
populating or decoupling a number of existing resistors in parallel within the second circuit path; or
trimming one or more of the parallel resistors within the second circuit path; or
a combination thereof.

28. The method of claim 24, where the at least one passive circuit component comprises multiple trimmable resistors that are coupled in parallel within the second circuit path; and where the method further comprises using laser trimming to tune the passive electrical characteristic of the passive circuit component by decoupling at least one of the multiple trimmable resistors from the second circuit path to vary the discernible resistance of the second circuit path without decoupling one or more others of the multiple trimmable resistors from the second circuit path.

* * * * *